(12) United States Patent
Shirai et al.

(10) Patent No.: US 6,466,863 B2
(45) Date of Patent: Oct. 15, 2002

(54) TRAVELING-PATH ESTIMATION APPARATUS FOR VEHICLE

(75) Inventors: Noriaki Shirai, Kariya (JP); Katsuhiro Morikawa, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/838,159

(22) Filed: Apr. 20, 2001

(65) Prior Publication Data

US 2001/0053955 A1 Dec. 20, 2001

(30) Foreign Application Priority Data

May 18, 2000 (JP) ...................................... 2000-146298

(51) Int. Cl.$^7$ ............................................. G01C 21/00
(52) U.S. Cl. ...................... 701/200; 701/301; 701/93; 701/96; 180/169; 180/197; 342/454
(58) Field of Search ................................ 701/200, 301, 701/93, 96; 180/169, 197; 340/435, 436, 437, 903; 4342/454, 104, 70, 61, 71, 456

(56) References Cited

U.S. PATENT DOCUMENTS

| | | | |
|---|---|---|---|
| 5,648,905 A | * 7/1997 | Izumi et al. ................. 701/301 |
| 5,710,565 A | 1/1998 | Shirai et al. .................. 342/70 |
| 5,745,870 A | 4/1998 | Yamamoto et al. ......... 701/301 |
| 5,754,099 A | * 5/1998 | Nishimura et al. ......... 340/435 |
| 6,018,308 A | 1/2000 | Shirai .......................... 342/70 |

FOREIGN PATENT DOCUMENTS

| | | |
|---|---|---|
| JP | 4-248489 | 9/1992 |
| JP | 8-132997 | 5/1996 |
| JP | 11-38142 | 2/1999 |
| JP | 11-125532 | 5/1999 |
| JP | 8-279099 | 10/1999 |
| JP | 2000-2535 | 1/2000 |

* cited by examiner

Primary Examiner—William A. Cuchlinski, Jr.
Assistant Examiner—Marthe Marc-Coleman
(74) Attorney, Agent, or Firm—Law Offices of David G. Posz

(57) ABSTRACT

An object in front of a vehicle is detected. At least one of a steering angle of the vehicle and a yaw rate thereof is detected. First curvature data are generated on the basis of at least one of the detected steering angle and the detected yaw rate. The first curvature data represent a course along which the vehicle will travel. A determination is made as to whether or not the detected object is a stationary object. In cases where the detected object is a stationary object, second curvature data are generated on the basis of the stationary object. The second curvature data represent a course along which the vehicle will travel. The first curvature data and the second curvature data are averaged. Third curvature data are generated in response to a result of the averaging. The third curvature data represent a course along which the vehicle will travel.

10 Claims, 6 Drawing Sheets

TRAVELING-PATH ESTIMATION APPARATUS FOR VEHICLE

BACKGROUND OF THE INVENTION

1. Field of the Invention

This invention relates to an on-vehicle apparatus for estimating a course or a path along which the present vehicle will travel. In addition, this invention relates to an on-vehicle apparatus for recognizing a preceding vehicle with respect to the present vehicle. Furthermore, this invention relates to a recording medium storing a computer program for estimating a course or a path along which a vehicle will travel.

2. Description of the Related Art

U.S. Pat. No. 5,745,870 corresponding to Japanese patent application publication number 8-132997 discloses a vehicle traveling-path prediction apparatus that detects a stationary object in front of the vehicle by utilizing an obstacle detection device. The apparatus in U.S. Pat. No. 5,745,870 predicts a path, along which the vehicle will travel, based on the detected stationary object. The apparatus includes a control unit. The control unit has an obstacle detection device, a stationary object detection device, a first traveling-path prediction device, a second traveling-path prediction device, and a selection device. The obstacle detection device receives a detection signal from a radar head, and detects an obstacle in front of the vehicle. The stationary object detection device receives an output signal from the obstacle detection device, and determines whether or not the obstacle detected by the obstacle detection device is a stationary object. Thus, the stationary object detection device acts to detect a stationary object in response to the output signal from the obstacle detection device. The first traveling-path prediction device receives an output signal from the stationary object detection device. If the stationary object detection device detects a stationary object in front of the vehicle, the first traveling-path prediction device calculates a radius of curvature R1 of a first traveling path based on data indicative of running conditions of the vehicle. The second traveling-path prediction device calculates a radius of curvature R2 of a second traveling path based on a vehicle velocity and a vehicle steering angle. If there is a stationary object in front of the vehicle, the selection device selects the first traveling path (R1) calculated by the first traveling-path prediction device. If there is no stationary object in front of the vehicle, the selection device selects the second traveling path (R2) calculated by the second traveling-path prediction device.

In the apparatus in U.S. Pat. No. 5,745,870, the first traveling path (R1) is determined on the basis of the detection of a stationary object. Therefore, the determination of the first traveling path (R1) tends to be poor in response performance. On the other hand, the second traveling path (R2) is determined on the basis of the vehicle velocity and the vehicle steering angle. The determination of the second traveling path (R2) is good in response performance. However, the second traveling path (R2) tends to have a steady error. Accordingly, in the case where the first traveling path (R1) is selected, there occurs a problem in response performance. In the case where the second traveling path (R2) is selected, there occurs a problem in accuracy.

Japanese patent application publication number 11-125532 discloses a vehicle traveling-path estimation apparatus including a control unit. The control unit has a first traveling-path estimation device and a second traveling-path estimation device. The first traveling-path estimation device estimates a first traveling path as a first curvature radius in response to the output signals from a yaw rate sensor and a vehicle speed sensor. The second traveling-path estimation device estimates a second traveling path as a circle in response to the output signal from a radar unit. The circle passes through the center of the present vehicle and the center of a preceding vehicle detected via the radar unit. The center of the circle is on a line perpendicular to the direction of travel of the present vehicle. The control unit has a difference calculator which computes the difference between the radius of the first traveling path and the radius of the second traveling path. The control unit has a filter which smooths the computed radius difference. The control unit has a correction device which corrects the first traveling path into a finally estimated traveling path in response to the smoothed radius difference.

Japanese patent application publication number 2000-2535 discloses a method of detecting a curvature of a curved road which is implemented by an apparatus mounted on a vehicle. According to the method in Japanese application 2000-2535, preceding vehicles with respect to the present vehicle are detected. Speed vectors of the preceding vehicles are calculated. Curvatures of a curved road are computed on the basis of the speed vectors of the preceding vehicles. A mean value among the computed curvatures is calculated as a finally-determined curvature of a curved road ahead of the present vehicle.

U.S. Pat. No. 5,710,565 corresponding to Japanese patent application publication number 8-279099 discloses an inter-vehicle distance control system which includes a laser scanning type distance sensor for emitting a scanning laser beam in a width-wise direction of the present vehicle to determine relative positions and relative angles of objects within a forward detectable zone. In the system of U.S. Pat. No. 5,710,565, the relative positions and the relative angles of the objects are used in calculating same lane probabilities that the objects exist in the same lane of a road as that used by the present vehicle. A target preceding vehicle with respect to the present vehicle is selected from among the objects based on the same lane probabilities. The speed of the present vehicle is controlled to keep constant the distance to the target preceding vehicle.

U.S. Pat. No. 6,018,308 corresponding to Japanese patent application publication number 11-38142 discloses an obstacle recognition system for an automotive vehicle which is designed to distinguish preceding vehicles from other objects. The system in U.S. Pat. No. 6,018,308 includes a radar unit and a preceding vehicle determining circuit. The radar unit receives a signal produced by reflection of at least one of transmitted radar signals from an obstacle present in a given obstacle detectable zone, and determines a distance to the obstacle and a horizontal and a vertical angle of the obstacle from a preselected reference direction. The preceding vehicle determining circuit includes a two-dimensional shape data producing circuit that produces two-dimensional shape data of the obstacle on a two-dimensional plane in a width-wise and a vertical direction of the present vehicle based on the distance and the horizontal and vertical angles. The preceding vehicle determining circuit also includes a non-vehicle determining circuit that determines the obstacle as an object other than the vehicle when the two-dimensional shape data of the obstacle lies out of an ordinary vehicle shape range.

In the system of U.S. Pat. No. 6,018,308, the non-vehicle determination is responsive to a variation in the height of the obstacle which occurs for a prescribed time interval. The design enables the non-vehicle determination to be accurate even in the case where the present vehicle is traveling along a road having a varying slope.

SUMMARY OF THE INVENTION

It is a first object of this invention to provide an improved on-vehicle apparatus for estimating a course or a path along which the present vehicle will travel.

It is a second object of this invention to provide an improved on-vehicle apparatus for recognizing a preceding vehicle with respect to the present vehicle.

It is a third object of this invention to provide a recording medium storing an improved computer program for estimating a course or a path along which a vehicle will travel.

A first aspect of this invention provides a course estimation apparatus for a vehicle. The apparatus comprises object detecting means for detecting an object in front of the vehicle; sensor means including at least one of steering angle detecting means for detecting a steering angle of the vehicle and yaw rate detecting means for detecting a yaw rate of the vehicle; first course estimating means for generating first curvature data on the basis of at least one of the steering angle and the yaw rate detected by the sensor means, the first curvature data representing a course along which the vehicle will travel; relative speed calculating means for calculating a relative speed between the object detected by the object detecting means and the vehicle; stationary-object determining means for determining whether or not the object detected by the object detecting means is a stationary object on the basis of the relative speed calculated by the relative speed calculating means; second course estimating means for, in cases where the stationary-object determining means determines that the object detected by the object detecting means is a stationary object, generating second curvature data on the basis of the stationary object, the second curvature data representing a course along which the vehicle will travel; and third course estimating means for averaging the first curvature data generated by the first course estimating means and the second curvature data generated by the second course estimating means, and generating third curvature data in response to a result of said averaging, the third curvature data representing a course along which the vehicle will travel.

A second aspect of this invention is based on the first aspect thereof, and provides a course estimation apparatus wherein the third course estimating means comprises means for detecting a distance to the stationary object from the vehicle; means for implementing weighted average between the first curvature data and the second curvature data in response to the detected distance; means for generating the third curvature data in response to a result of said weighted average; and means for making great a weight for the first curvature data in the weighted average and making small a weight for the second curvature data in the weighted average when the detected distance is small.

A third aspect of this invention is based on the first aspect thereof, and provides a course estimation apparatus wherein the third course estimating means comprises means for detecting a distance to the stationary object from the vehicle; means for implementing weighted average between the first curvature data and the second curvature data in response to the detected distance; means for generating the third curvature data in response to a result of said weighted average; and means for making great a weight for the first curvature data in the weighted average and making great a weight for the second curvature data in the weighted average when the detected distance is great.

A fourth aspect of this invention provides a recording medium storing a computer program comprising the steps of generating first curvature data on the basis of at least one of a signal representing a steering angle of a vehicle and a signal representing a yaw rate of the vehicle, the first curvature data representing a course along which the vehicle will travel; generating second curvature data on the basis of a signal corresponding to a stationary object, the second curvature data representing a course along which the vehicle will travel; averaging the first curvature data and the second curvature data; and generating third curvature data in response to a result of said averaging, the third curvature data representing a course along which the vehicle will travel.

A fifth aspect of this invention provides a preceding-vehicle recognition apparatus for a subject vehicle. The apparatus comprises the course estimation apparatus of the first aspect of this invention; relative position detecting means for detecting positions of objects detected by the object detecting means in the course estimation apparatus relative to the subject vehicle; lane-sameness probability calculating means for calculating a probability for each of the objects that the object and the subject vehicle are on a same lane on the basis of the third curvature data generated by the third course estimating means in the course estimation apparatus and the relative position detected by the relative position detecting means; and preceding-vehicle detecting means for detecting a preceding vehicle with respect to the subject vehicle among the objects in response to the probabilities calculated by the lane-sameness probability calculating means.

A sixth aspect of this invention is based on the first aspect thereof, and provides a course estimation apparatus wherein the third course estimating means comprises means for detecting a distance to the stationary object from the vehicle; means for setting a weight for the first curvature data and a weight for the second curvature data in response to the detected distance; means for implementing weighted average between the first curvature data and the second curvature data in response to the weight for the first curvature data and the weight for the second curvature data; and means for generating the third curvature data in response to a result of said weighted average; wherein the weight for the first curvature data decreases and the weight for the second curvature data increases as the detected distance increases.

A seventh aspect of this invention provides an apparatus for a vehicle. The apparatus comprises first means for detecting a speed of the vehicle; second means for detecting a steering angle of the vehicle; third means for estimating a curvature radius of a course, along which the vehicle will travel, from the vehicle speed detected by the first means and the steering angle detected by the second means; fourth means for detecting a stationary object in front of the vehicle; fifth means for detecting a position of the stationary object detected by the fourth means relative to the vehicle; sixth means for detecting a speed of the stationary object detected by the fourth means relative to the vehicle; seventh means for estimating the curvature radius of the course from the stationary-object position detected by the fifth means and the stationary-object relative speed detected by the sixth means; eighth means for averaging a reciprocal of the curvature radius estimated by the third means and a reciprocal of the curvature radius estimated by the seventh means; and ninth means for estimating the curvature radius of the course in response to a result of the averaging by the eighth means.

An eighth aspect of this invention is based on the seventh aspect thereof, and provides an apparatus wherein the eighth means comprises means for detecting a distance to the stationary object from the vehicle; means for setting a first weight for the reciprocal of the curvature radius estimated by the third means and a second weight for the reciprocal of the curvature radius estimated by the seventh means in response to the detected distance to the stationary object from the vehicle; means for implementing weighted average between the reciprocal of the curvature radius estimated by the third means and the reciprocal of the curvature radius estimated by the seventh means in response to the first and second weights; and means for setting a result of the weighted average as the result of the averaging by the eighth means; wherein the first weight decreases and the second weight increases as the detected distance to the stationary object from the vehicle increases.

A ninth aspect of this invention provides an apparatus for a vehicle. The apparatus comprises first means for detecting a speed of the vehicle; second means for detecting a yaw rate of the vehicle; third means for estimating a curvature radius of a course, along which the vehicle will travel, from the vehicle speed detected by the first means and the yaw rate detected by the second means; fourth means for detecting a stationary object in front of the vehicle; fifth means for detecting a position of the stationary object detected by the fourth means relative to the vehicle; sixth means for detecting a speed of the stationary object detected by the fourth means relative to the vehicle; seventh means for estimating the curvature radius of the course from the stationary-object position detected by the fifth means and the stationary-object relative speed detected by the sixth means; eighth means for averaging a reciprocal of the curvature radius estimated by the third means and a reciprocal of the curvature radius estimated by the seventh means; and ninth means for estimating the curvature radius of the course in response to a result of the averaging by the eighth means.

A tenth aspect of this invention is based on the ninth aspect thereof, and provides an apparatus wherein the eighth means comprises means for detecting a distance to the stationary object from the vehicle; means for setting a first weight for the reciprocal of the curvature radius estimated by the third means and a second weight for the reciprocal of the curvature radius estimated by the seventh means in response to the detected distance to the stationary object from the vehicle; means for implementing weighted average between the reciprocal of the curvature radius estimated by the third means and the reciprocal of the curvature radius estimated by the seventh means in response to the first and second weights; and means for setting a result of the weighted average as the result of the averaging by the eighth means; wherein the first weight decreases and the second weight increases as the detected distance to the stationary object from the vehicle increases.

DETAILED DESCRIPTION OF THE INVENTION

First Embodiment

Figure 1:
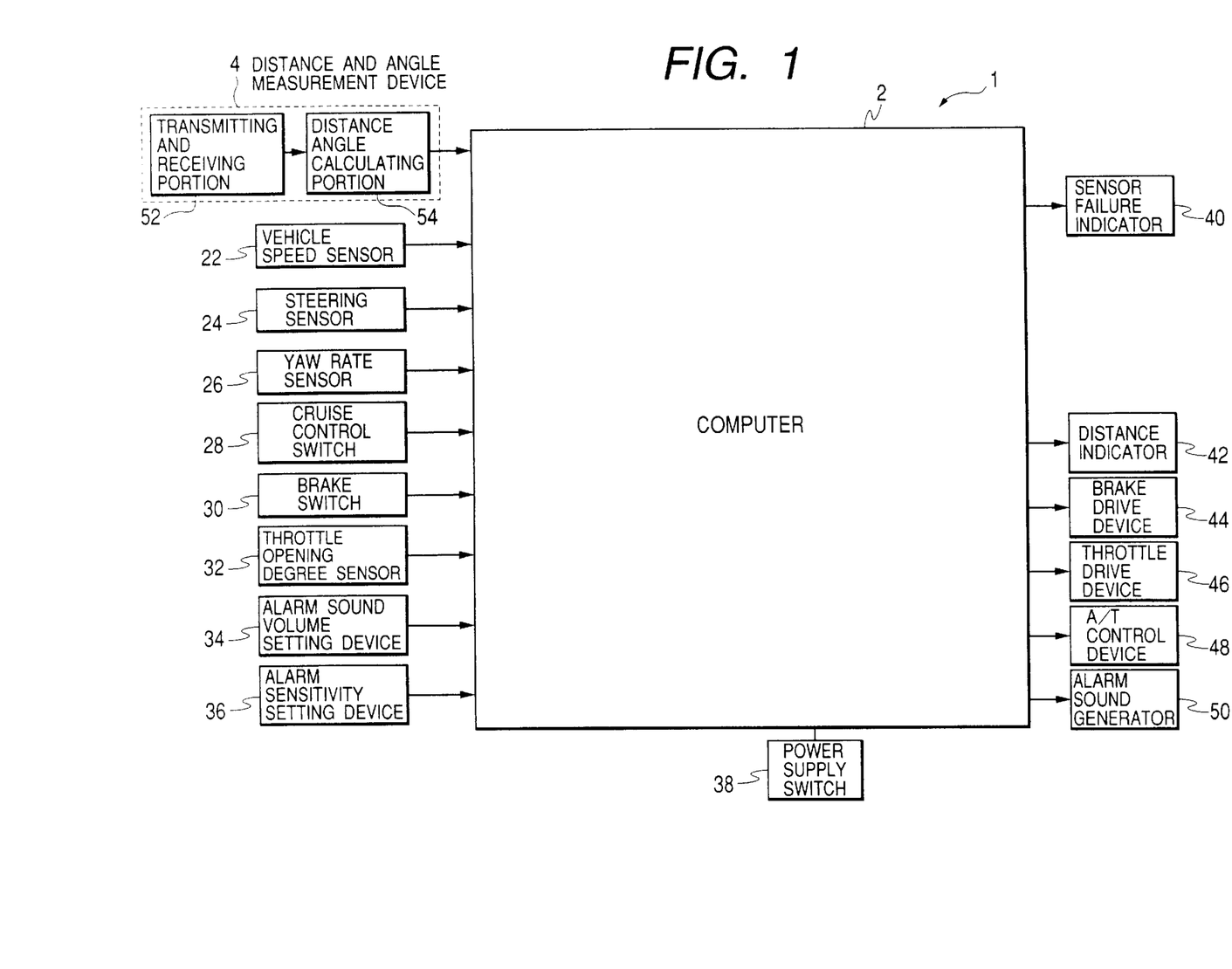
FIG. 1 is a block diagram of an inter-vehicle distance control apparatus including a course estimation apparatus (a traveling-path estimation apparatus), a preceding-vehicle detection apparatus (a preceding-vehicle recognition apparatus), and a recording medium according to a first embodiment of this invention.

FIG. 1 shows an inter-vehicle distance control apparatus 1 according to a first embodiment of this invention. The inter-vehicle distance control apparatus 1 is mounted on a vehicle. The inter-vehicle distance control apparatus 1 includes a course estimation apparatus (a traveling-path estimation apparatus), a preceding-vehicle detection apparatus (a preceding-vehicle recognition apparatus), and a recording medium.

As shown in FIG. 1, the inter-vehicle distance control apparatus 1 includes a computer (for example, a microcomputer) 2. The computer 2 has a combination of an input/output (I/O) interface, a CPU, a ROM, and a RAM. The computer 2 operates in accordance with a program stored in the ROM. The program may be stored in the RAM. In this case, the RAM is provided with a backup device.

Alternatively, the program may be stored in a recording medium such as a floppy disk, a magneto-optical disk, a CD-ROM, a DVD-ROM, or a hard disk. In this case, the computer 2 is connected with a drive for the recording medium, and the program is downloaded into the computer 2 through the drive.

The inter-vehicle distance control apparatus 1 includes a distance and angle measurement device 4, a vehicle speed sensor 22, a steering sensor 24, a yaw rate sensor 26, a cruise control switch 28, a brake switch 30, a throttle opening degree sensor (a throttle position sensor) 32, an alarm sound volume setting device 34, and an alarm sensitivity setting device 36 which are connected to the computer 2. The output signals of the devices 4, 22, 24, 26, 28, 30, 32, 34, and 36 are inputted into the computer 2.

The inter-vehicle distance control apparatus 1 includes a sensor failure indicator 40, a distance indicator 42, a brake drive device 44, a throttle drive device 46, an automotive automatic transmission control device 48, and an alarm sound generator 50 which are connected to the computer 2. The computer 2 outputs drive signals to the devices 40, 42, 44, 46, 48, and 50.

The inter-vehicle distance control apparatus 1 includes a power supply switch 38 connected to the computer 2. When the power supply switch 38 is changed to its on position, the computer 2 is powered and starts predetermined processes. The computer 2 is designed to implement inter-vehicle distance control. In addition, the computer 2 is designed to implement vehicle cruise control when an objective preceding vehicle is nonselected. According to the cruise control, the speed of the present vehicle is maintained at a setting value.

The distance and angle measurement device 4 corresponds to a radar device. The distance and angle measurement device 4 has a transmitting and receiving portion 52, and a distance and angle calculating portion 54. The transmitting and receiving portion 52 emits a forward laser beam ahead of the present vehicle, and controls the forward laser beam to periodically scan a given angular region in front of the present vehicle. The given angular region corresponds to a given sectorial detection area monitored by the transmitting and receiving portion 52. In the case where an object exists in the detection area (the given angular region), the forward laser beam encounters the object before being at least partially reflected thereby. A portion of the reflected laser beam returns to the transmitting and receiving portion 52 as an echo laser beam. The transmitting and receiving portion 52 receives the echo laser beam, and converts the echo laser beam into a corresponding electric signal. The transmitting and receiving portion 52 outputs the electric signal to the distance and angle calculating portion 54. The distance and angle calculating portion 54 detects the angle (the angular position) "φ" of the object in response to the output signal from the transmitting and receiving portion 52. The distance and angle calculating portion 54 measures the time interval between the moment of the transmission of a forward laser beam and the moment of the reception of a related echo laser beam in response to the output signal from the transmitting and receiving portion 52. The distance and angle calculating portion 54 detects the distance "r" to the object from the present vehicle on the basis of the measured time interval. The distance and angle calculating portion 54 informs the computer 2 of the angle (the angular position) "φ" of the object and the distance "r" thereto.

The laser beam may be replaced by a radio wave beam, a millimeter wave beam, or an ultrasonic beam. The scanning may be implemented by controlling the echo beam reception by the transmitting and receiving portion 52.

The vehicle speed sensor 22 is associated with a wheel of the present vehicle. The vehicle speed sensor 22 detects the rotational speed of the vehicle wheel. The vehicle speed sensor 22 outputs a signal to the computer 2 which represents the detected rotational speed of the vehicle wheel.

The steering sensor 24 detects the degree of operation of a vehicle steering wheel (not shown), that is, the steering angle in the present vehicle. Specifically, the steering sensor 24 detects a quantity of change of the steering angle. The steering sensor 24 outputs a signal to the computer 2 which represents the detected quantity of change of the steering angle. When the power supply switch 38 is moved to its on position, a variable used in the computer 2 as an indication of a detected steering angle "θ" (radian) is initialized to "0". After the movement of the power supply switch 38 to its on position, the detected steering angle "θ" is decided by integrating the quantity of change of the steering angle which is represented by the output signal of the steering sensor 24.

The yaw rate sensor 26 detects the rate Ω (radian/second) of change in the rotational angle (the yaw angle) of the body of the present vehicle about the vertical axis thereof. The yaw rate sensor 26 informs the computer 2 of the detected yaw rate Ω.

When the cruise control switch 28 is changed to its on position, the computer 2 operates to start the vehicle cruise control. During the execution of the vehicle cruise control, signal processing for the inter-vehicle distance control can be implemented by the computer 2. When the computer 2 determines that the present vehicle is excessively close to an objective preceding vehicle, the alarm sound generator 50 is activated by the computer 2 to generate alarm sound. The volume of the generated alarm sound is equal to a level adjustably determined by the alarm sound volume setting device 34. The sensitivity of generation of alarm sound can be adjusted by the alarm sensitivity setting device 36.

The brake switch 30 detects depression of a brake pedal of the present vehicle. The brake switch 30 informs the computer 2 of the detected brake-pedal depression. The brake drive device 44 adjusts the braking pressure in response to the drive signal outputted from the computer 2.

The throttle opening degree sensor 32 detects the degree of opening through a vehicular engine throttle valve. The throttle opening degree sensor 32 outputs a signal to the computer 2 which represents the detected throttle opening degree. The computer 2 controls the throttle drive device 46 in response to the detected throttle opening degree, thereby adjusting the actual degree of opening through the throttle valve and adjusting the power output of the engine.

The computer 2 determines whether or not the distance and angle measurement device 4 is operating normally by referring to the output signal therefrom. When the computer 2 determines that the distance and angle measurement device 4 is not operating normally, the sensor failure indicator 40 is controlled by the computer 2 to indicate a failure.

The computer 2 selects an objective preceding vehicle from among candidate preceding vehicles detected in response to the output signal of the distance and angle measurement device 4. The computer 2 calculates the distance to the objective preceding vehicle from the present vehicle. The distance indicator 42 is controlled by the computer 2 to indicate the calculated distance to the objective preceding vehicle from the present vehicle.

The automotive automatic transmission control device 48 selects a used gear position of an automotive automatic transmission and thereby controls the speed of the present vehicle in response to the output signal from the computer 2.

Figure 2:
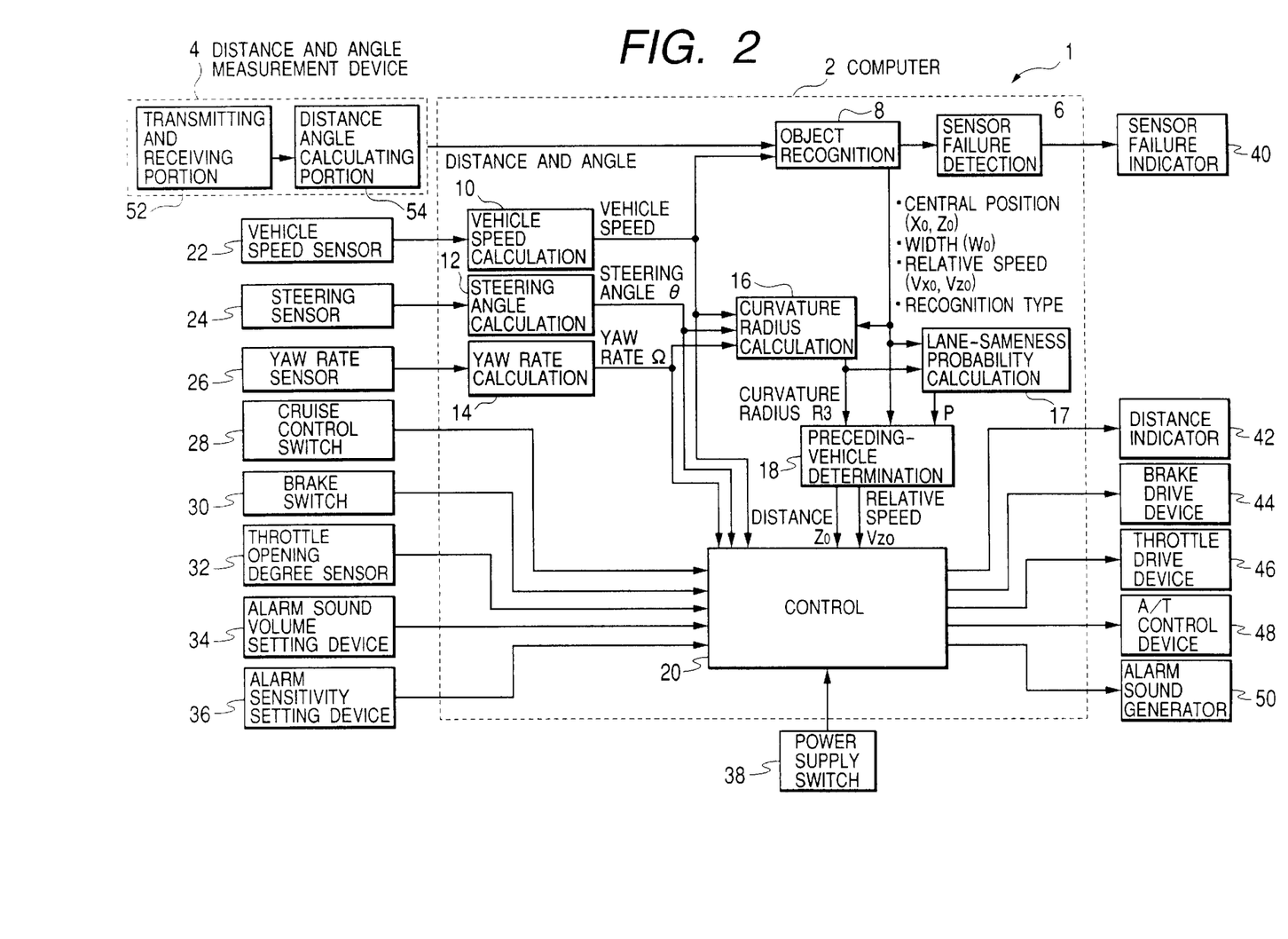
FIG. 2 is an operation flow diagram of a computer in FIG. 1.

FIG. 2 shows the flow of operation of the computer 2 rather than the hardware structure thereof. With reference to FIG. 2, an object recognition block 8 receives, from the distance and angle calculating portion 54 in the distance and angle measurement device 4, measurement data representing a distance "r" and an angle "φ" concerning each detected object. The object recognition block 8 converts the distance and angle data of polar coordinates into measurement data of X-Z orthogonal coordinates designed so that the origin (0, 0) coincides with the center of a laser radar formed by the distance and angle measurement device 4, and the X axis and the Z axis coincide with a width-wise direction and a longitudinal forward direction of the present vehicle respectively.

A vehicle speed calculation block 10 computes the speed V of the present vehicle on the basis of the output signal from the vehicle speed sensor 22. The vehicle speed calculation block 10 informs the object recognition block 8 of the computed vehicle speed V.

The object recognition block 8 calculates and determines the central position (Xo, Zo) and transverse width Wo of each detected object, the speed (VXo, VZo) of the object relative to the present vehicle, and the recognition type of the object on the basis of the orthogonal-coordinate measurement data and the vehicle speed V. Here, the recognition type of each detected object indicates whether the object is stationary or moving. Regarding the central position (Xo, Zo) of each detected object, Xo denotes the position of the center of the object in the width-wise direction of the present vehicle while Zo denotes the position of the center of the object in the longitudinal forward direction of the present vehicle.

A steering angle calculation block 12 computes the steering angle "θ" regarding the present vehicle on the basis of the output signal from the steering sensor 24. A yaw rate calculation block 14 computes the yaw rate Ω of the present vehicle on the basis of the output signal from the yaw rate sensor 26.

A curvature-radius calculation block 16 is informed of the vehicle speed V by the vehicle speed calculation block 10. The curvature-radius calculation block 16 is informed of the steering angle "θ" by the steering angle calculation block 12. The curvature-radius calculation block 16 is informed of the yaw rate Ω by the yaw rate calculation block 14. The curvature-radius calculation block 16 computes a first curvature radius R1 (corresponding to first curvature data) on the basis of at least one of the vehicle speed V, the steering angle "θ", and the yaw rate Ω. The first curvature radius R1 means the radius of curvature of a course, a path, or a road portion along which the present vehicle will travel.

The curvature-radius calculation block 16 is informed of the central position (Xo, Zo), the transverse width Wo, the relative speed (VXo, VZo), and the recognition type of each detected object by the object recognition block 8. For each stationary object recognized by the object recognition block 8, the curvature-radius calculation block 16 computes a second curvature radius R2 (corresponding to second curvature data) on the basis of the previously-indicated parameters related to the stationary object. The second curvature radius R2 means the radius of curvature of a course, a path, or a road portion along which the present vehicle will travel.

The curvature-radius calculation block 16 averages the first curvature radius R1 and the second curvature radius or radii R2. Specifically, the curvature-radius calculation block 16 averages the reciprocal of the first curvature radius R1 and the reciprocal of the second curvature radius R2 (or the reciprocals of the second curvature radii R2). The curvature-radius calculation block 16 computes a third curvature radius R3 (corresponding to third curvature data) on the basis of the result of the averaging. In other words, the curvature-radius calculation block 16 computes a third curvature radius R3 (corresponding to third curvature data) on the basis of a mean or an average between the reciprocal of the first curvature radius R1 and the reciprocal of the second curvature radius R2 (or the reciprocals of the second curvature radii R2).

A lane-sameness probability calculation block 17 is informed of the third curvature radius R3 by the curvature-radius calculation block 16. The lane-sameness probability calculation block 17 is informed of the central position (Xo, Zo), the transverse width Wo, the relative speed (VXo, VZo), and the recognition type of each detected object by the object recognition block 8. The lane-sameness probability calculation block 17 detects preceding vehicles among the detected objects by referring to the central positions (Xo, Zo), the transverse widths Wo, the relative speeds (VXo, VZo), and the recognition types thereof. The lane-sameness probability calculation block 17 computes the probability (the lane-sameness probability) P that the lanes along which the present vehicle and each preceding vehicle are traveling respectively are the same on the basis of the third curvature radius R3, and the central position (Xo, Zo), and the transverse width Wo.

A preceding-vehicle determination block 18 is informed of the third curvature radius R3 by the curvature-radius calculation block 16. The preceding-vehicle determination block 18 is informed of the lane-sameness probability P for each preceding vehicle by the lane-sameness probability calculation block 17. The preceding-vehicle determination block 18 is informed of the central position (Xo, Zo), the transverse width Wo, the relative speed (VXo, VZo), and the recognition type of each detected object by the object recognition block 8. The preceding-vehicle determination block 18 detects an objective preceding vehicle on the basis of the lane-sameness probabilities P, the third curvature radius R3, the central positions (Xo, Zo), the transverse widths Wo, the relative speeds (VXo, VZo), and the recognition types of the detected objects. Specifically, the preceding-vehicle determination block 18 selects an objective preceding vehicle from among candidate objects and candidate preceding vehicles in response to the lane-sameness probabilities P, the third curvature radius R, the central positions (Xo, Zo), the transverse widths Wo, the relative speeds (VXo, VZo), and the recognition types of the detected objects. The preceding-vehicle determination block 18 informs a control block 20 of the distance Zo to the objective preceding vehicle from the present vehicle, and also the relative speed VZo of the objective preceding vehicle in the longitudinal forward direction of the present vehicle (that is, the direction along which the present vehicle is traveling).

The control block 20 is informed of the vehicle speed V by the vehicle speed calculation block 10. The control block 20 is informed of the steering angle "θ" by the steering angle calculation block 12. The control block 20 is informed of the yaw rate Ω by the yaw rate calculation block 14. The control block 20 receives the output signals from the devices 28, 30, 32, 34, and 36. The control block 20 generates drive signals for the devices 42, 44, 46, 48, and 50 in response to the distance Zo to the objective preceding vehicle from the present vehicle, the relative speed VZo of the objective preceding vehicle, the vehicle speed V, the steering angle "θ", the yaw rate Ω, and the output signals of the devices 28, 30, 32, 34, and 36. The control block 20 outputs the generated drive signals to the devices 42, 44, 46, 48, and 50. For example, the control block 20 generates drive signals for the devices 42, 44, 46, 48, and 50 on the basis of the distance Zo to the objective preceding vehicle from the present vehicle, the relative speed VZo of the objective preceding vehicle, the state of the cruise control switch 28, and the brake-pedal depression-related condition represented by the output signal of the brake switch 30. The drive signals for the brake drive device 44, the throttle drive device 46, and the automotive automatic transmission control device 48 are designed to adjust the actual distance to the objective preceding vehicle from the present vehicle. The drive signal for the distance indicator 42 is designed to indicate the distance to the objective preceding vehicle from the present vehicle. The drive signal for the alarm sound generator 50 is designed to generate alarm sound and hence warn the driver of the present vehicle when the relation of the present vehicle with the objective preceding vehicle falls into pre-scribed warning conditions. The control block 20 outputs the generated drive signals to the devices 42, 44, 46, 48, and 50.

A sensor failure detection block 6 receives the output data (the object-recognition result data) from the object recognition block 8 which represent the object parameters calculated thereby. The sensor failure detection block 6 determines whether the output data from the object recognition block 8 are in a normal range or an abnormal range, that is, whether the distance and angle measurement device 4 is operating normally or abnormally. When the output data from the object recognition block 8 are in the abnormal range, the sensor failure detection block 6 activates the sensor failure indicator 40 to indicate a failure of the distance and angle measurement device 4.

The distance and angle measurement device 4 corresponds to object detecting means. The object recognition block 8 corresponds to relative speed calculating means.

Figure 3:
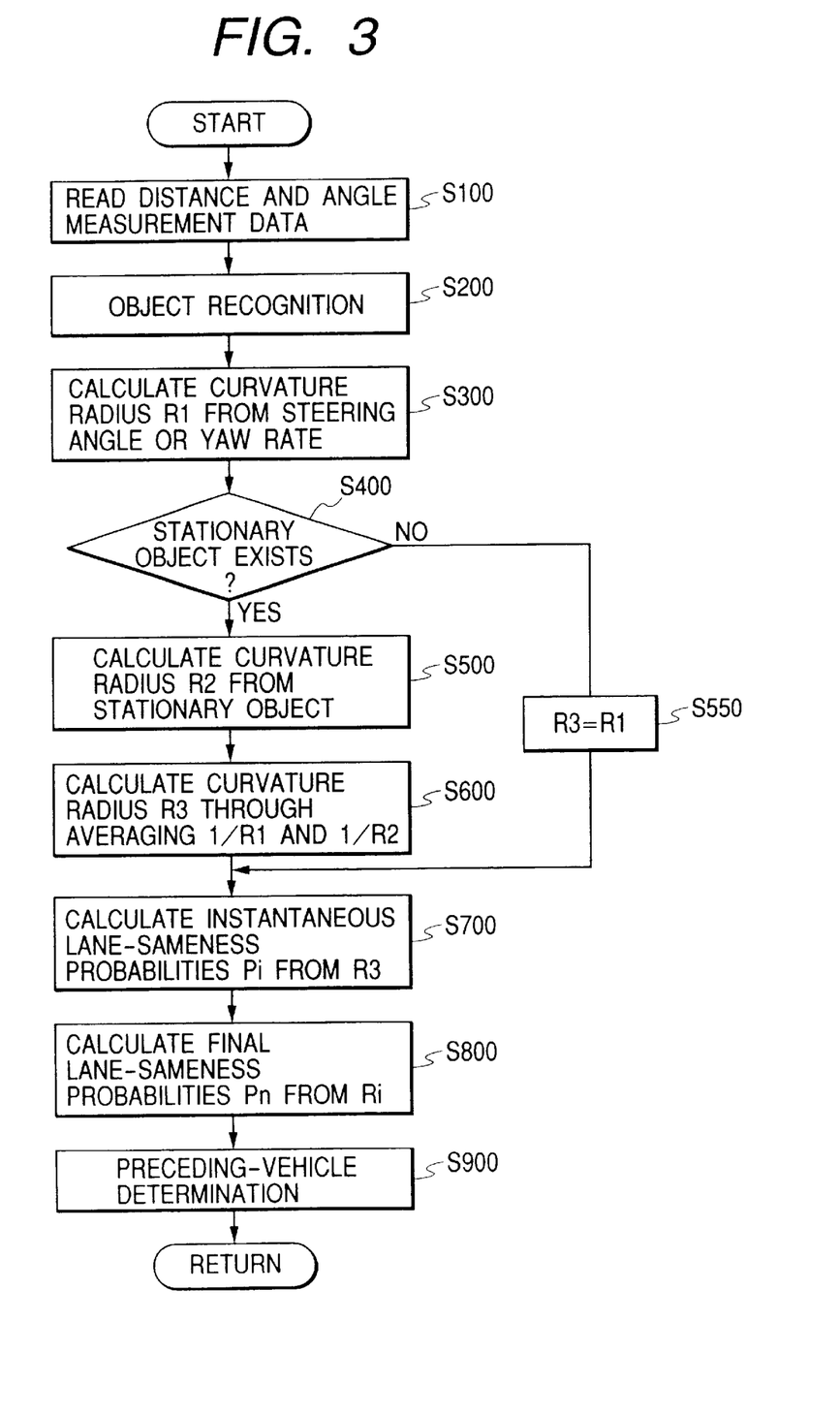
FIG. 3 is a flowchart of a segment of a program for the computer in FIG. 1.

As previously mentioned, the computer 2 operates in accordance with a program stored in its internal ROM or RAM. FIG. 3 is a flowchart of a segment of the program for the computer 2 which relates to the determination of a preceding vehicle. The program segment in FIG. 3 is repetitively executed at a period corresponding to the period of the scanning implemented by the distance and angle measurement device 4. The period of repetitive execution of the program segment is equal to, for example, 100 msec.

As shown in FIG. 3, a first step S100 of the program segment receives distance and angle measurement data from the distance and angle measurement device 4 for one period of the scanning. In other words, the step S100 receives distance and angle measurement data corresponding to one frame. The scanning period is equal to, for example, 100 msec.

A step S200 following the step S100 converts the distance and angle data of polar coordinates into measurement data of X-Z orthogonal coordinates. The step S200 calculates the central position (Xo, Zo) and transverse width Wo of each detected object on the basis of the orthogonal-coordinate measurement data. The step S200 computes a time-domain variation in the central position (Xo, Zo) of each detected object. The step S200 calculates the speed (VXo, VZo) of each detected object relative to the present vehicle on the basis of the computed time-domain variation in the central position (Xo, Zo) thereof. The step S200 gets information of the speed V of the present vehicle from the output signal of the vehicle speed sensor 22. The step S200 determines whether each detected object is stationary or moving on the basis of the vehicle speed V and the relative speed (VXo, VZo) of the object. The result of the "stationary/moving" determination is denoted by the recognition type. For example, in the case where the relative speed (VXo, VZo) of an object indicates that the central position (Xo, Zo) thereof relative to the present vehicle is substantially fixed while the vehicle speed V differs from zero, the step S200 determines that the object is moving. In the case where the relative speed (VXo, VZo) of an object indicates that the central position (Xo, Zo) thereof is moving away from the present vehicle, the step S200 determines that the object is moving. In the case where the relative speed (VXo, VZo) of an object indicates that the central position (Xo, Zo) thereof is moving toward the present vehicle at a speed equal to the vehicle speed V, the step S200 determines that the object is stationary. The step S200 recognizes other objects to be undetermined. An example of other objects is one which appears in the detection area at a moment preceding the present time by a short interval insufficient to implement the "stationary/moving" determination.

A step S300 subsequent to the step S200 gets information of the steering angle "θ" from the output signal of the steering sensor 24. The step S300 gets information of the yaw rate Ω from the output signal of the yaw rate sensor 26. Also, step S300 gets information of the vehicle speed V. The step S300 computes the first curvature radius R1 (corresponding to the first curvature data) on the basis of the vehicle speed V, the steering angle "θ", and the yaw rate Ω. The first curvature radius R1 means the radius of curvature of a course, a path, or a road portion along which the present vehicle will travel.

The step S300 may compute the first curvature radius R1 from the steering angle "θ" and the vehicle speed V according to the following equation.

$$R1 = C/\theta \quad (1)$$

where C denotes a value depending on the type of the present vehicle and the vehicle speed V. The ROM within the computer 2 stores data representing a map of a predetermined relation among the value C, the type of the present vehicle, and the vehicle speed V. The step S300 derives the value C by accessing the map in response to the vehicle speed V and the type of the present vehicle.

Alternatively, the step S300 may compute the first curvature radius R1 from the vehicle speed V and the yaw rate Ω. In this case, the step S300 divides the vehicle speed V by the yaw rate Ω, and sets the division result as the first curvature radius R1.

A step S400 following the step S300 determines whether or not at least one of the detected objects is stationary by referring to the recognition types of the detected objects which are given by the step S200. In the case where at least one of the detected objects is stationary, the program advances from the step S400 to a step S500. In the case where none of the detected objects is stationary, the program advances from the step S400 to a step S550.

Figure 4:
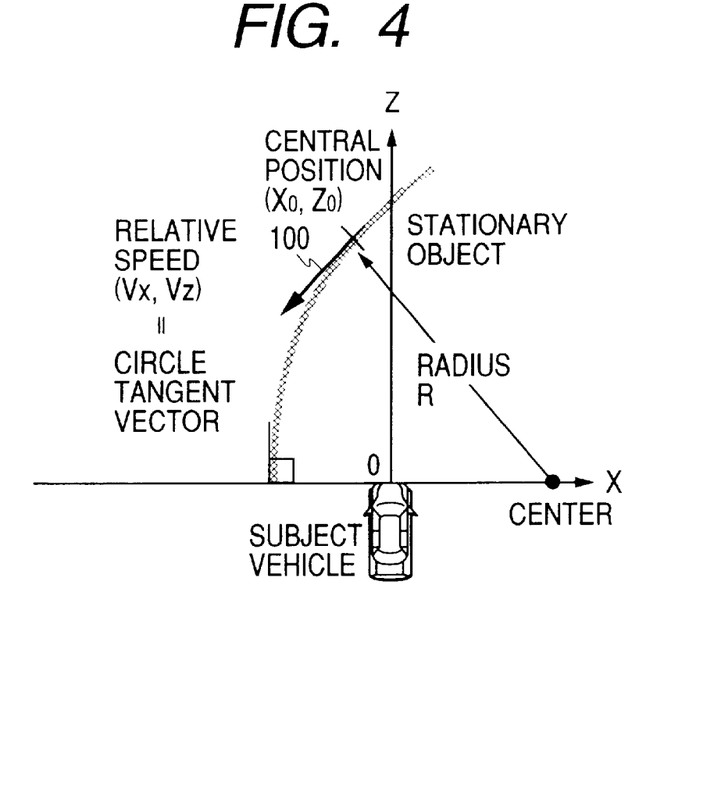
FIG. 4 is a diagram of a vehicle, a stationary object, and a portion of a circle.

The step S500 computes the second curvature radius R2 (corresponding to the second curvature data) for each stationary object on the basis of the central position (Xo, Zo) and the relative speed (VXo, VZo) thereof. The second curvature radius R2 means the radius of curvature of a course, a path, or a road portion along which the present vehicle will travel. Specifically, as shown in FIG. 4, a circle having a radius R is calculated for each stationary object. The circle passes through the central position (Xo, Zo) of the stationary object. A tangent vector on the circle is equal in direction to the relative speed vector 100 for the stationary object. The center of the circle is on the X axis (the width-wise direction of the present vehicle). The circle intersects with the X axis at a right angle. The step S500 uses the radius R of the circle as the second curvature radius R2.

In more detail, a circle having a radius R is calculated which passes through the center (Xo, Zo) of each stationary object, and which intersects with the X axis at a right angle. On the supposition that $|Xo|<<|R|$ and $|Xo|<<Zo$, a parabola is approximate to the circle and hence the circle is expressed by the following equation.

$$X = Xo + \{(Z-Zo)^2/2\,R\} \quad (2)$$

Since the tangent vector on the circle is equal in direction to the relative speed vector (VXo, VZo) for the stationary object, the following equation is available.

$$dX/dZ = VXo/VZo \quad (3)$$

From the equations (2) and (3), the radius R is given as follows.

$$R = (Z-Zo) \cdot VZo/Vxo \quad (4)$$

The radius R is used as the second curvature radius R2. Therefore, the second curvature radius R2 is expressed by the following equation.

$$R2 = (Z-Zo) \cdot VZo/VXo \quad (5)$$

In the case where there are a plurality of stationary objects so that a plurality of the second curvature radii R2 are available, the values R2 are averaged into a final second curvature radius R2 used by a later step. For example, it is assumed that there are first and second stationary objects. The second curvature radius for the first stationary object is denoted by R2a while the second curvature radius for the second stationary object is denoted by R2b. The reciprocal of a final second curvature radius R2 is expressed by the following function (6) for averaging the reciprocal of the radius R2a and the reciprocal of the radius R2b.

$$1//R2 = \{(1/R2a) + (1/R2b)\}/2 \qquad (6)$$

Thus, the final second curvature radius R2 is calculated from the radii R2a and R2b according to the following equation.

$$R2 = 2 \cdot R2a \cdot R2b / (R2a + R2b) \qquad (7)$$

A step S600 subsequent to the step S500 computes the third curvature radius R3 (corresponding to the third curvature data) from the first and second curvature radii R1 and R2 according to the following mean-related or average-related equation.

$$R3 = 2 \cdot R1 \cdot R1 / (R1 + R2) \qquad (8)$$

In other words, the reciprocal of the third curvature radius R3 is equal to a mean or an average between the reciprocal of the first curvature radius R1 and the reciprocal of the second curvature radius R2. After the step S600, the program advances to a step S700.

It should be noted that the step S600 may compute the third curvature radius R3 from the first and second curvature radii R1 and R2 according to one of the following averaging equations (8A) and (8B).

$$R3 = (R1 + R2)/2 \qquad (8A)$$

$$R3 = \sqrt{R1 \cdot R2} \qquad (8B)$$

The step S550 sets the third curvature radius R3 (corresponding to the third curvature data) to the first curvature radius R1. After the step S550, the program advances to the step S700.

Figure 5:
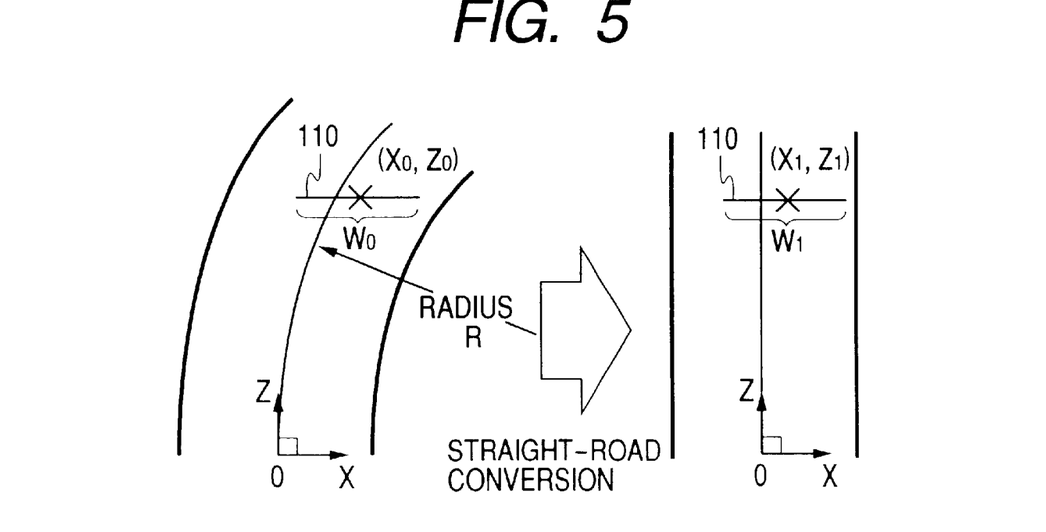
FIG. 5 is a diagram of conversion of coordinates.

For each of the objects detected by the step S200, the step S700 computes the instantaneous probability (the instantaneous lane-sameness probability) Pi that the object is a preceding vehicle traveling along the lane same as the lane along which the present vehicle is moving. The computation of the instantaneous lane-sameness probability Pi is based on the third curvature radius R3 given by the step S550 or S600, and the central position (Xo, Zo) and the transverse width Wo of the object. Specifically, as shown in FIG. 5, the step S700 converts the coordinates (Xo, Zo) of the central position of each detected object into the coordinates (X1, Z1) thereof which occur on the assumption that the present vehicle is traveling along a straight road. In addition, the step S700 converts the transverse width Wo of the object into the transverse width Wi thereof which occurs on the assumption that the present vehicle is traveling along the straight road. In more detail, the step S700 converts the coordinate values Xo and Zo and the width value Wo into the coordinate values Xi and Zi and the width value W1 according to the following equations.

$$X1 = Xo - (Zo \cdot Zo / 2R3)$$

$$Z1 = Zo$$

$$W1 = Wo \qquad (9)$$

The equations (9) are made on the basis of approximation using the assumption that the absolute value of the coordinate value Xo is significantly smaller than the third curvature radius R3 and the coordinate value Zo ($|Xo| << |R3|$ and $|Xo| << Zo$). The ROM within the computer 2 stores data representing a map of a predetermined relation among the instantaneous lane-sameness probability Pi, the coordinate values X1 and Z1, and the width value W1. The step S700 derives the instantaneous lane-sameness probability Pi by accessing the map in response to the coordinate values X1 and Z1 and the width value W1.

Figure 6:
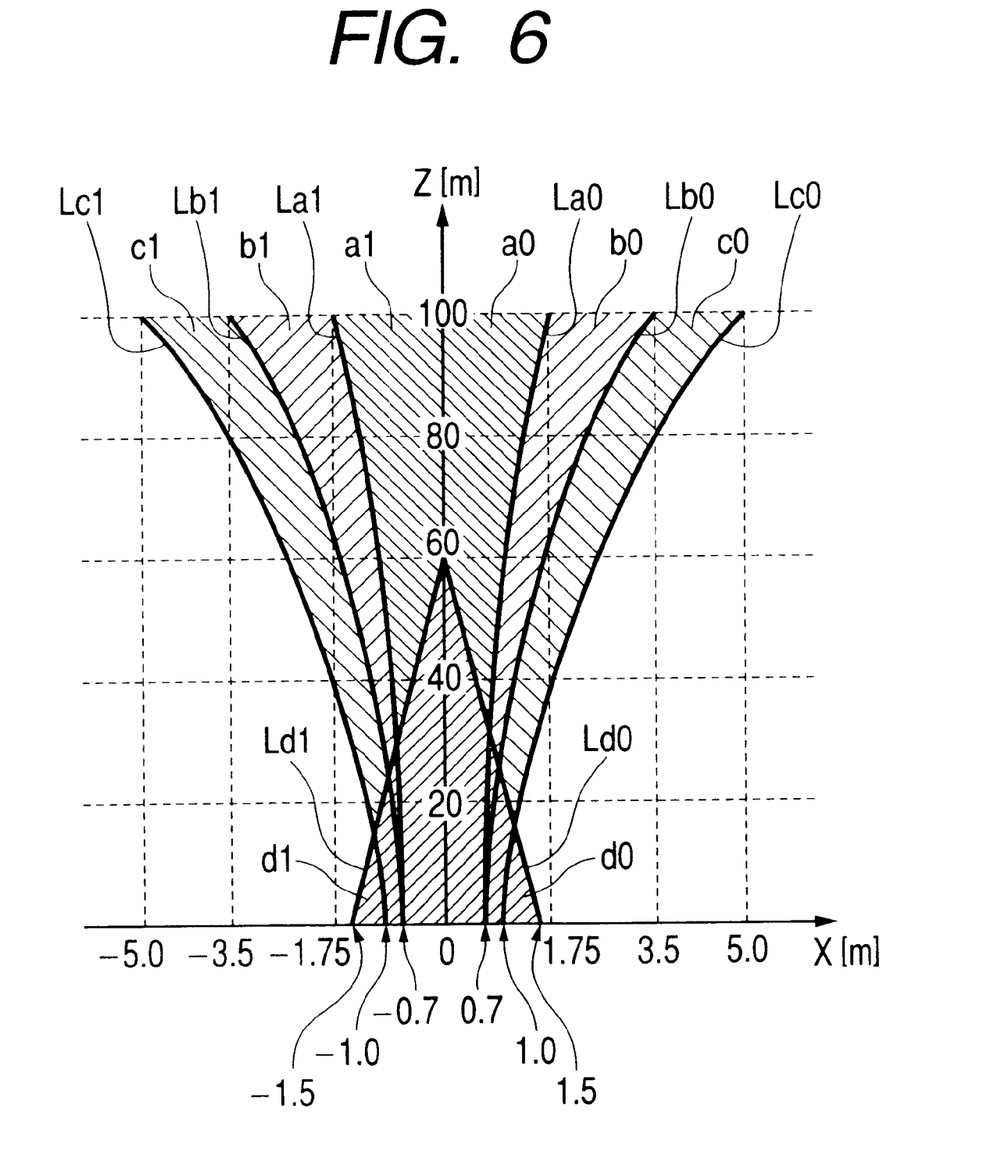
FIG. 6 is a diagram of a map for determining an instantaneous lane-sameness probability which is separated into regions.

FIG. 6 shows an example of the map for the instantaneous lane-sameness probability Pi. In FIG. 6, the X axis corresponds to the width-wise direction of the present vehicle while the Z axis corresponds to the longitudinal forward direction of the present vehicle (that is, the direction along which the present vehicle is traveling). With reference to FIG. 6, there are separate regions a0, b0, c0, d0, e0, a1, b1, c1, d1, and e1. The regions a0 and a1 are symmetrical with respect to the Z axis. The regions b0 and b1 are symmetrical with respect to the Z axis. The regions c0 and c1 are symmetrical with respect to the Z axis. The regions d0 and d1 are symmetrical with respect to the Z axis. The regions e0 and e1 are symmetrical with respect to the Z axis. An instantaneous lane-sameness probability Pi of 80% is assigned to the regions a0 and a1. An instantaneous lane-sameness probability Pi of 60% is assigned to The regions b0 and b1. An instantaneous lane-sameness probability Pi of 30% is assigned to the regions c0 and c1. An instantaneous lane-sameness probability Pi of 100% is assigned to the regions d0 and d1. An instantaneous lane-sameness probability Pi of 0% is assigned to the regions e0 and e1. The setting of the regions a0, b0, c0, d0, e0, a1, b1, c1, d1, and e1, and the assignment of probability values thereto are decided in consideration of the results of experiments including actual measurement. Preferably, the regions d0 and d1 are chosen in view of the case where another vehicle suddenly comes into a zone immediately preceding the present vehicle. There are boundaries La0, Lb0, Lc0, and Ld0 among the regions a0, b0, c0, d0, and e0. The boundaries La0, Lb0, Lc0, and Ld0 are given according to the following equations.

$$La0: X1 = 0.70 + (1.75 - 0.70) \cdot (Z1/100)^2$$

$$Lb0: X1 = 0.70 + (3.50 - 0.70) \cdot (Z1/100)^2$$

$$Lc0: X1 = 1.00 + (5.00 - 1.00) \cdot (Z1/100)^2$$

$$Ld0: X1 = 1.50 \cdot (1 - Z1/60) \qquad (10)$$

There are boundaries La1, Lb1, Lc1, and Ld1 among the regions a1, b1, c1, d1, and e1. The boundaries La0 and La1 are symmetrical with respect to the Z axis. The boundaries Lb0 and Lb1 are symmetrical with respect to the Z axis. The boundaries Lc0 and Lc1 are symmetrical with respect to the Z axis. The boundaries Ld0 and Ld1 are symmetrical with respect to the Z axis. The boundaries La1, Lb1, Lc1, and Ld1 are decided by referring to the symmetrical relation with the boundaries La0, Lb0, Lc0, and Ld0.

For the regions d0 and d1, the step S700 handles each detected object as a segment 110 of a transverse line which has a length equal to the transverse width W1 (see FIG. 5). ① When at least part of the line segment 110 is in or on the regions d0 and d1, the step S700 sets the instantaneous lane-sameness probability Pi for the corresponding object to 100%. ② When the central position (X1, Z1) of an object is in the regions a0 and a1, the step S700 sets the instantaneous lane-sameness probability Pi for the object to 80%. ③ When the central position (X1, Z1) of an object is in the regions b0 and b1, the step S700 sets the instantaneous lane-sameness probability Pi for the object to 60%. ④ When the central position (X1, Z1) of an object is in the regions c0 and c1, the step S700 sets the instantaneous lane-sameness probability Pi for the object to 30%. For an object which satisfies none of the previously-indicated conditions ①, ②, ③, and ④, the step S700 sets the instantaneous lane-sameness probability Pi to 0%.

Figure 7:
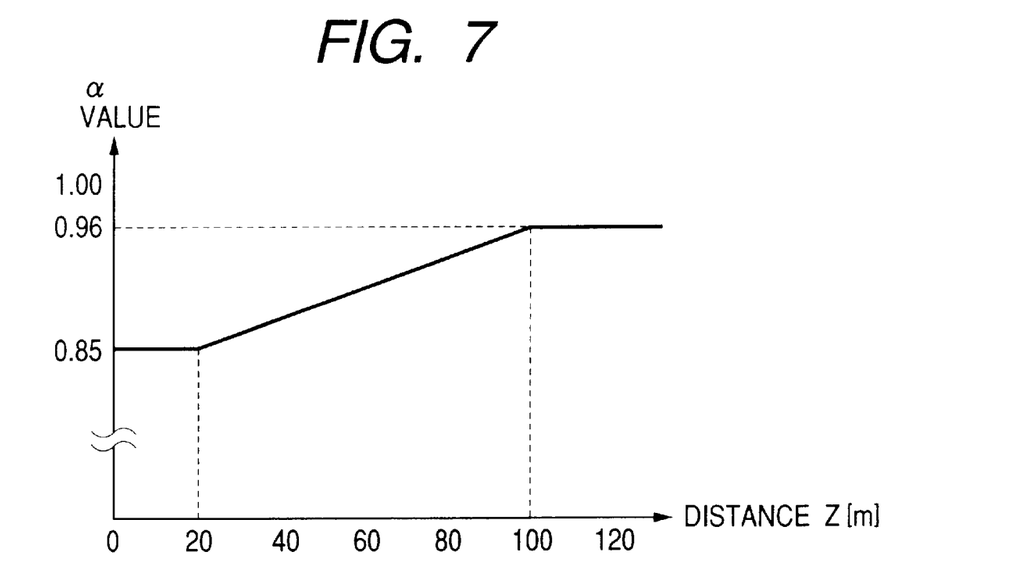
FIG. 7 is a diagram of a map representing a relation between a parameter "α" and a distance Z.

With reference back to FIG. 3, a step S800 following the step S700 processes the instantaneous lane-sameness probabilities Pi for the respective detected objects which are given by the step S700. Specifically, the step S800 subjects each of the instantaneous lane-sameness probabilities Pi to a filtering process corresponding to a smoothing or low-pass filtering process. In more detail, for each of the detected objects, the step S800 calculates a current filtering-resultant lane-sameness probability (a current final lane-sameness probability) $P_n$ from the instantaneous lane-sameness probability Pi according to the following equation.

$$P_n = P_{n-1} \cdot \alpha + Pi \cdot (1-\alpha) \quad (11)$$

where $P_{n-1}$ denotes an immediately-previous filtering-resultant lane-sameness probability (an immediately-previous final lane-sameness probability), and "$\alpha$" denotes a parameter depending on the distance Z (Z1 or Zo) to the object from the present vehicle. With reference to FIG. 7, the ROM within the computer 2 stores data representing a map of a predetermined relation between the parameter "$\alpha$" and the distance Z. The step S800 derives the value of the parameter "$\alpha$" by accessing the map in response to the distance Z. In FIG. 7, the parameter "$\alpha$" remains equal to 0.85 as the distance Z increases from 0 m to 20 m. The parameter "$\alpha$" linearly increases from 0.85 to 0.96 as the distance Z increases from 20 m to 100 m. The parameter "$\alpha$" remains equal to 0.96 as the distance Z increases from 100 m. The initial value of the current filtering-resultant lane-sameness probability (the current final lane-sameness probability) $P_n$ is equal to 0%.

A step S900 subsequent to the step S800 determines or selects an objective preceding vehicle for the inter-vehicle distance control from among the detected objects in response to the current filtering-resultant lane-sameness probabilities (the current final lane-sameness probabilities) $P_n$. Specifically, from among the objects, the step S900 selects ones as candidate objects which correspond to lane-sameness probabilities $P_n$ equal to or greater than 50%. Then, the step S900 compares the distances Z to the candidate objects from the present vehicle to find the smallest distance. Subsequently, from among the candidate objects, the step S900 selects one as an objective preceding vehicle which corresponds to the smallest distance. In this way, the step S900 determines the objective preceding vehicle for the inter-vehicle distance control. The present vehicle is controlled in response to the distance to the objective preceding vehicle and the relative speed thereof to maintain the distance between the present vehicle and the objective preceding vehicle at a safety constant value. When the present vehicle is excessively close to the objective preceding vehicle, alarm sound is generated. After the step S900, the current execution cycle of the program segment ends.

The object recognition by the step S200 corresponds to stationary-object determining means. The calculation of the first curvature radius R1 by the step S300 corresponds to first course estimating means. The calculation of the second curvature radius or radii R2 by the step S500 corresponds to second course estimating means. The averaging process by the step S600 corresponds to third course estimating means. The calculation of the lane-sameness probabilities $P_n$ by the step S800 corresponds to line-sameness probability calculating means. The determination of the objective preceding vehicle by the step S900 corresponds to preceding-vehicle recognizing means.

The inter-vehicle distance control apparatus 1 provides advantages indicated below. The first curvature radius R1 is calculated from the steering angle "θ" and the yaw rate Ω. The second curvature radius R2 is calculated from conditions of a stationary object. The third curvature radius R3 is calculated on the basis of a result of averaging the reciprocal of the first curvature radius R1 and the reciprocal of the second curvature radius R2. The first curvature radius R1 is better than the second curvature radius R2 in calculation response performance. On the other hand, the second curvature radius R2 is better than the first curvature radius R1 in accuracy. Thus, the third curvature radius R3 is relatively accurate, and the determination of the third curvature radius R3 is good in response performance. Specifically, the third curvature radius R3 remains accurate while the present vehicle travels under normal conditions. In addition, the third curvature radius R3 quickly follows conditions where the steering wheel of the present vehicle is abruptly operated.

Second Embodiment

A second embodiment of this invention is similar to the first embodiment thereof except for a design change mentioned later. A step S600 in the second embodiment of this invention is modified from that in the first embodiment of this invention.

Figure 8:
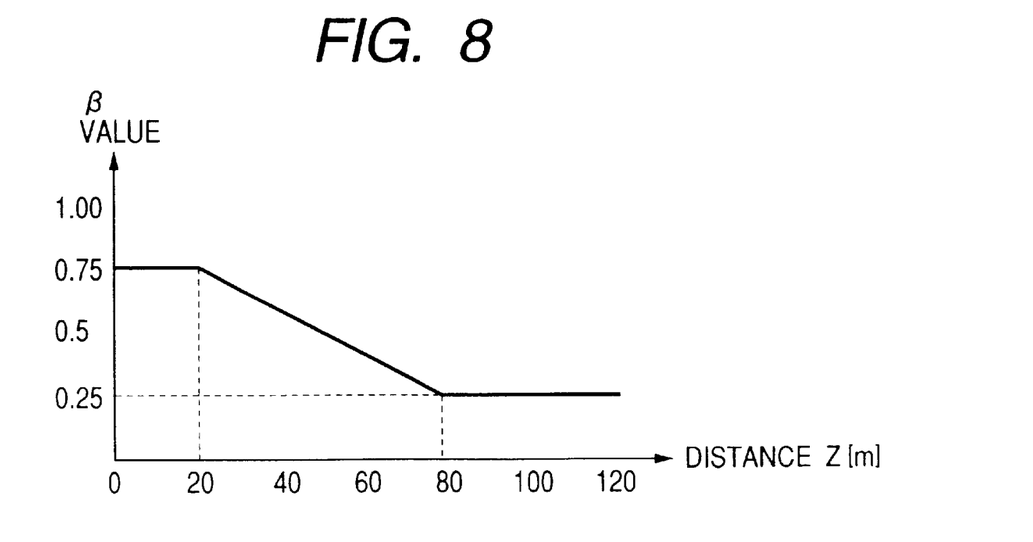
FIG. 8 is a diagram of a map representing a relation between a parameter "β" and a distance Z in a second embodiment of this invention.

In the second embodiment of this invention, the step S600 computes the third curvature radius R3 (corresponding to the third curvature data) from the first and second curvature radii R1 and R2 through weighted mean or weighted average using weights depending on the distance Z to the related stationary object from the present vehicle. Specifically, the step S600 implements the weighted average (the weighted mean) between the reciprocal of the first curvature radius R1 and the reciprocal of the second curvature radius R2 according to the following equation.

$$1/R\,3 = (1/R1) \cdot \beta = (1/R2) \cdot (1-\beta) \quad (12)$$

where "β" and "(1—β)" denote weights respectively. The weight "β" is a parameter. With reference to FIG. 8, the ROM within the computer 2 stores data representing a map of a predetermined relation between the parameter "β" and the distance Z. The step S600 derives the value of the parameter "β" by accessing the map in response to the distance Z. In FIG. 8, the parameter "β" remains equal to 0.75 as the distance Z increases from 0 m to 20 m. The parameter "β" linearly decreases from 0.75 to 0.25 as the distance Z increases from 20 m to 80 m. The parameter "β" remains equal to 0.25 as the distance Z increases from 80 m. The step S600 computes the third curvature radius R3 from the reciprocal thereof.

As understood from FIG. 8 and the equation (12), the weight "β" for the reciprocal of the first curvature radius R1 is relatively great when the distance Z to an object from the present vehicle is relatively small. Thus, it is possible to quickly determine whether or not an object is a preceding vehicle in the case where the distance Z to the object is relatively small. On the other hand, the weight "(1—β)" for the reciprocal of the second curvature radius R2 is relatively great when the distance Z to an object from the present vehicle is relatively great. Thus, it is possible to accurately determine whether or not an object is a preceding vehicle in the case where the distance Z to the object is relatively great.

What is claimed is:

1. A course estimation apparatus for a vehicle, comprising:
   object detecting means for detecting an object in front of the vehicle;
   sensor means including at least one of steering angle detecting means for detecting a steering angle of the vehicle and yaw rate detecting means for detecting a yaw rate of the vehicle;
   first course estimating means for generating first curvature data on the basis of at least one of the steering angle and the yaw rate detected by the sensor means, the first curvature data representing a course along which the vehicle will travel;
   relative speed calculating means for calculating a relative speed between the object detected by the object detecting means and the vehicle;
   stationary-object determining means for determining whether or not the object detected by the object detecting means is a stationary object on the basis of the relative speed calculated by the relative speed calculating means;
   second course estimating means for, in cases where the stationary-object determining means determines that the object detected by the object detecting means is a stationary object, generating second curvature data on the basis of the stationary object, the second curvature data representing a course along which the vehicle will travel; and
   third course estimating means for averaging the first curvature data generated by the first course estimating means and the second curvature data generated by the second course estimating means, and generating third curvature data in response to a result of said averaging, the third curvature data representing a course along which the vehicle will travel.

2. A course estimation apparatus as recited in claim 1, wherein the third course estimating means comprises:
   means for detecting a distance to the stationary object from the vehicle;
   means for implementing weighted average between the first curvature data and the second curvature data in response to the detected distance;
   means for generating the third curvature data in response to a result of said weighted average; and
   means for making great a weight for the first curvature data in the weighted average and making small a weight for the second curvature data in the weighted average when the detected distance is small.

3. A course estimation apparatus as recited in claim 1, wherein the third course estimating means comprises:
   means for detecting a distance to the stationary object from the vehicle;
   means for implementing weighted average between the first curvature data and the second curvature data in response to the detected distance;
   means for generating the third curvature data in response to a result of said weighted average; and
   means for making small a weight for the first curvature data in the weighted average and making great a weight for the second curvature data in the weighted average when the detected distance is great.

4. A recording medium storing a computer program comprising the steps of:
   generating first curvature data on the basis of at least one of a signal representing a steering angle of a vehicle and a signal representing a yaw rate of the vehicle, the first curvature data representing a course along which the vehicle will travel;
   generating second curvature data on the basis of a signal corresponding to a stationary object, the second curvature data representing a course along which the vehicle will travel;
   averaging the first curvature data and the second curvature data; and
   generating third curvature data in response to a result of said averaging, the third curvature data representing a course along which the vehicle will travel.

5. A preceding-vehicle recognition apparatus for a subject vehicle, comprising:
   the course estimation apparatus of claim 1;
   relative position detecting means for detecting positions of objects detected by the object detecting means in the course estimation apparatus relative to the subject vehicle;
   lane-sameness probability calculating means for calculating a probability for each of the objects that the object and the subject vehicle are on a same lane on the basis of the third curvature data generated by the third course estimating means in the course estimation apparatus and the relative position detected by the relative position detecting means; and
   preceding-vehicle detecting means for detecting a preceding vehicle with respect to the subject vehicle among the objects in response to the probabilities calculated by the lane-sameness probability calculating means.

6. A course estimation apparatus as recited in claim 1, wherein the third course estimating means comprises:
   means for detecting a distance to the stationary object from the vehicle;
   means for setting a weight for the first curvature data and a weight for the second curvature data in response to the detected distance;
   means for implementing weighted average between the first curvature data and the second curvature data in response to the weight for the first curvature data and the weight for the second curvature data; and
   means for generating the third curvature data in response to a result of said weighted average;
   wherein the weight for the first curvature data decreases and the weight for the second curvature data increases as the detected distance increases.

7. An apparatus for a vehicle, comprising:
   first means for detecting a speed of the vehicle;
   second means for detecting a steering angle of the vehicle;
   third means for estimating a curvature radius of a course, along which the vehicle will travel, from the vehicle speed detected by the first means and the steering angle detected by the second means;
   fourth means for detecting a stationary object in front of the vehicle;
   fifth means for detecting a position of the stationary object detected by the fourth means relative to the vehicle;
   sixth means for detecting a speed of the stationary object detected by the fourth means relative to the vehicle;

seventh means for estimating the curvature radius of the course from the stationary-object position detected by the fifth means and the stationary-object relative speed detected by the sixth means;

eighth means for averaging a reciprocal of the curvature radius estimated by the third means and a reciprocal of the curvature radius estimated by the seventh means; and ninth means for estimating the curvature radius of the course in response to a result of the averaging by the eighth means.

8. An apparatus as recited in claim 7, wherein the eighth means comprises:

means for detecting a distance to the stationary object from the vehicle;

means for setting a first weight for the reciprocal of the curvature radius estimated by the third means and a second weight for the reciprocal of the curvature radius estimated by the seventh means in response to the detected distance to the stationary object from the vehicle;

means for implementing weighted average between the reciprocal of the curvature radius estimated by the third means and the reciprocal of the curvature radius estimated by the seventh means in response to the first and second weights; and means for setting a result of the weighted average as the result of the averaging by the eighth means;

wherein the first weight decreases and the second weight increases as the detected distance to the stationary object from the vehicle increases.

9. An apparatus for a vehicle, comprising:

first means for detecting a speed of the vehicle;

second means for detecting a yaw rate of the vehicle;

third means for estimating a curvature radius of a course, along which the vehicle will travel, from the vehicle speed detected by the first means and the yaw rate detected by the second means;

fourth means for detecting a stationary object in front of the vehicle;

fifth means for detecting a position of the stationary object detected by the fourth means relative to the vehicle;

sixth means for detecting a speed of the stationary object detected by the fourth means relative to the vehicle;

seventh means for estimating the curvature radius of the course from the stationary-object position detected by the fifth means and the stationary-object relative speed detected by the sixth means;

eighth means for averaging a reciprocal of the curvature radius estimated by the third means and a reciprocal of the curvature radius estimated by the seventh means; and ninth means for estimating the curvature radius of the course in response to a result of the averaging by the eighth means.

10. An apparatus as recited in claim 9, wherein the eighth means comprises:

means for detecting a distance to the stationary object from the vehicle;

means for setting a first weight for the reciprocal of the curvature radius estimated by the third means and a second weight for the reciprocal of the curvature radius estimated by the seventh means in response to the detected distance to the stationary object from the vehicle;

means for implementing weighted average between the reciprocal of the curvature radius estimated by the third means and the reciprocal of the curvature radius estimated by the seventh means in response to the first and second weights; and means for setting a result of the weighted average as the result of the averaging by the eighth means;

wherein the first weight decreases and the second weight increases as the detected distance to the stationary object from the vehicle increases.

* * * * *